July 29, 1969   N. J. MACKENZIE ET AL   3,457,997
ROTOR MOUNTING

Filed Sept. 15, 1967   2 Sheets-Sheet 1

INVENTORS
NEIL J. MACKENZIE
WILLIAM D. NEATHERY

Richards, Harris & Hubbard
ATTORNEY

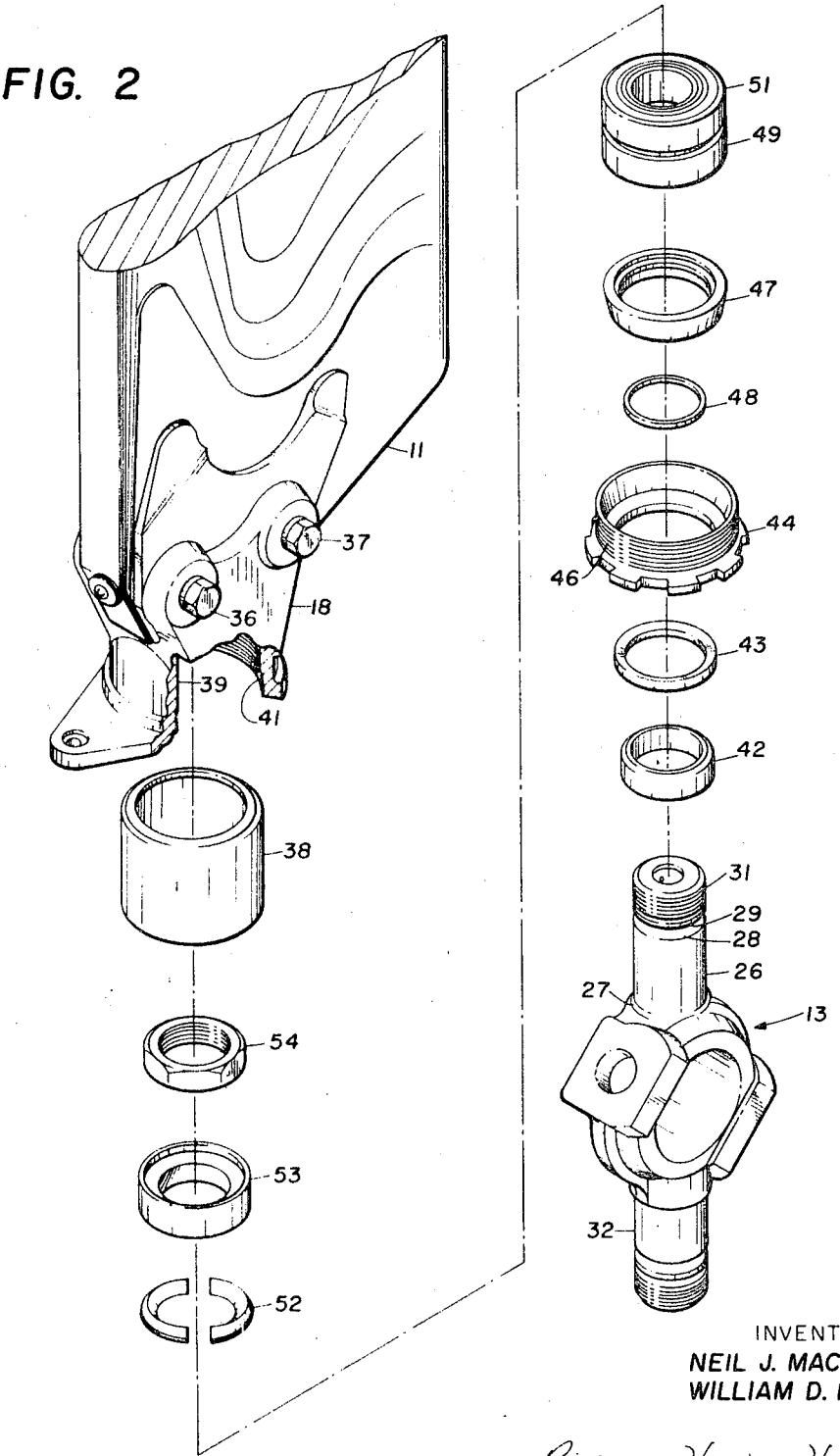

United States Patent Office 3,457,997
Patented July 29, 1969

3,457,997
ROTOR MOUNTING
Neil J. Mackenzie, Dallas, and William D. Neathery, Fort Worth, Tex., assignors to Bell Aerospace Corporation, a corporation of Delaware
Filed Sept. 15, 1967, Ser. No. 668,051
Int. Cl. B63h 1/06, 5/12, 5/14
U.S. Cl. 170—160.58                 12 Claims

ABSTRACT OF THE DISCLOSURE

Apparatus for transferring the bending moments generated in a helicopter rotor blade to the spindle of a rotor hub wherein the spindle includes a transfer groove adjacent the threaded end. A split ring is nested in the transfer groove by means of a wedge ring. One or more shims is inserted between a radius ring and the rotor bearings to properly position the split ring to insure a substantially rigid blade/hub mounting. The transfer groove in cooperation with the split ring and wedge ring provides a rotor mounting arrangement that transfers the load of the rotor blade onto the spindle.

Background of the invention

This invention relates to a rotor mounting, and more particularly to a rotor mounting wherein bending moments in the rotor blade are transferred to a rotor hub spindle.

Helicopter main and tail rotor blades are generally attached to driveshaft-mounted spindles about the axis of which the blades can be rotated for purposes of pitch change, and to which the blades are generally otherwise attached in a substantially rigid manner. Both main rotor and tail rotor blades are subjected to bending moments as a result of the cyclical fluctuation of the lift or thrust forces exerted by the blades in translational flight. This cyclic variation results from the fact that during one-half of its revolution the blade will be advancing into the relative wind and, during the other half of its revolution will be retreating from the relative wind. Thus, as the helicopter translates, the blade experiences cyclically varying loads and bending moments throughout its rotation which must be transmitted to the supporting structure through the hub spindle.

Thus a feature of the invention is to provide a rotor mounting wherein the bending moments of a rotor blade are transferred onto the rotor hub spindle at a point where the radius of curvature is relatively large thereby avoiding concentrated stress locations.

In accordance with the present invention, stresses caused by the bending moments of a rotor are minimized in the rotor hub spindle.

Thus, a feature of the invention is to provide a tail rotor mounting wherein the bending moments of a rotor blade are transferred onto the rotor hub spindle at a point where the radius of curvature is relatively large thereby avoiding concentrated stress locations.

Summary of the invention

A system for transferring the bending moments generated in a helicopter rotor blade with minimal stress to a spindle having a fastener at one end thereof, a peripheral groove juxtapositioned the fastener and a coupling mounted thereon for supporting a rotor grip. A transfer ring is assembled into said groove between the rotor grip coupling and the spindle fastener to isolate said fastener from high stress concentrations.

Brief description of the drawings

FIGURE 2 is an exploded view of a tail rotor coupling in accordance with the present invention.

Description of the preferred embodiment

Figure 1:
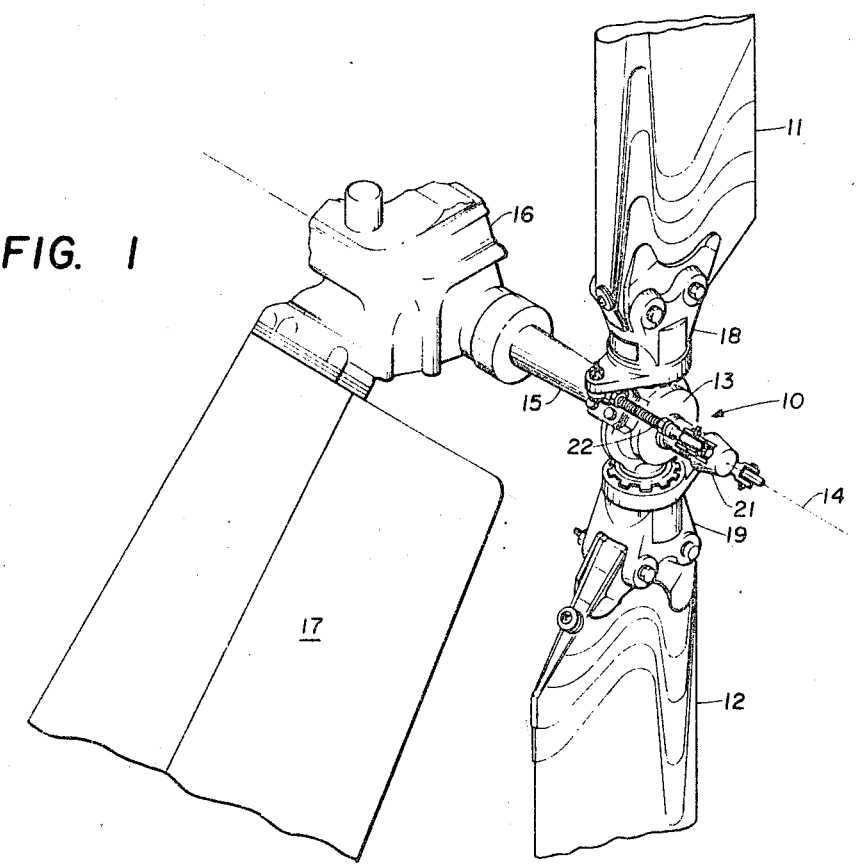
FIGURE 1 is a view of the tail section of a helicopter showing the rotor blades mounted in their operative position.

Referring to FIGURE 1, there is shown a tail rotor assembly, generally indicated at 10, including rotor blades 11 and 12 mounted to a rotor hub 13 for rotation about an axis 14. The rotor hub 13 is coupled to the output shaft 15 of a gearbox 16 which is mounted to the tail section 17 (illustrated in a fragmentary manner).

The rotor blades 11 and 12 are coupled to the hub 13 by means of blade grips 18 and 19, respectively, each having a pitch horn for controlling the blade pitch. The pitch horn of the rotor grip 18 is coupled to collective head 21 by means of a control linkage 22. Similarly, the pitch horn of the rotor grip 19 is also coupled to the collective head 21 by a control linkage (not shown), similar to the linkage 22. A collective control tube (not shown) extends through the output shaft 15 of the gearbox 16 and connects to the collective head 21.

To vary the pitch of the rotor blades 11 and 12, the pilot causes the collective control tube to be extended or retracted through the output shaft 15 of the gearbox 16 thereby causing the collective head 21 to move away from or toward the hub 13. Movement of the collective head 21 causes the rotor blades 11 and 12 to rotate about their individual rotor spindle, to be described, thereby changing the pitch of the rotor blades.

Referring to FIGURE 2, there is shown an exploded view of a tail rotor coupling which transfers the load of the flapping rotor blade onto a spindle 26 at a point where the radius of curvature is relatively large. A curved throat 27 forms the transition between the hub 13 and the cylindrical section of the spindle 26. The spindle 26 includes a transfer groove 28, a thread relief groove 29, and a terminal threaded section 31.

A spindle 32, similar in construction to the spindle 26, positioned 180° from the spindle 26, provides a means for coupling the rotor blade 12 to the hub 13.

In FIGURE 2, only the coupling for the rotor blade 11 is shown; it being understood, that a similar coupling mechanism would be employed to connect the rotor blade 12 to the spindle 32. The rotor blade 11 is bolted to the rotor grip 18 by means of machine screws 36 and 37. A spacer cylinder 38 is assembled into the cavity 39 of the grip 18. The cavity 39 includes a threaded end section 41.

A radius ring 42 is assembled on the spindle 26 at the throat section 27 to provide a reference point for the remaining parts of the rotor coupling. A packing seal 43 encircles the outer surface of the radius ring 42 as a barrier between the atmosphere and the coupling parts to prevent dust and dirt particles from abrading the close tolerance parts. A grip retention nut 44 having a threaded section 46 for mating with the threaded section 41 of the cavity 39 is placed on the spindle 26. The inside diameter of the grip retention nut 44 is such that a space exists between the spindle 26 to allow the nut to rotate with respect to the spindle. The packing seal 43 is held in place by means of a packing gland 47 having a tapered outer diameter to mate with the tapered inner configuration of the grip retention nut 44.

It is not intended to imply that the coupling is assembled in the order that the various parts are being described. Juxtaposed the end of the radius ring 29, toward the threaded section 31, are one or more shim rings 48 for positioning of the transfer ring 52 as will be described. Two ball bearings 49 and 51, having angular as well as radial bearing surfaces, are press fit onto the spindle 26. Next, a two piece transfer ring 52 is assembled into the transfer groove 28. The transfer ring 52 consists of two semicircular sections having a curved inner surface matching the curvature of the transfer groove 28. It is held in place and wedged into the groove by means of a wedge ring 53 having a tapered inner diameter. The radius ring 42, the bearings 49 and 51, the transfer ring 52, and the wedge ring 53 are held in place on the spindle 26 by means of a nut 54 served onto the threaded section 31.

A similar set of components is required in the coupling for attaching the rotor blade 12 to the spindle 32. It is not deemed necessary to show the coupling for the rotor blade 11 for this reason.

Figure 3:
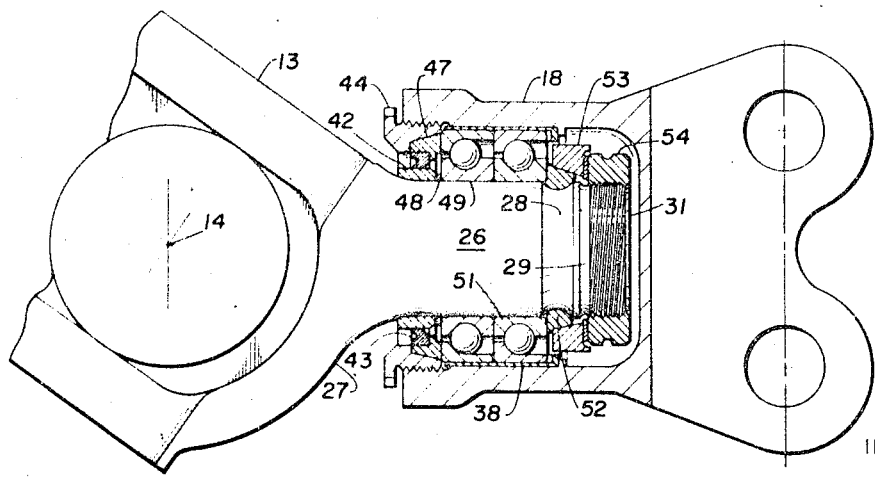
FIGURE 3 is a sectional view of a portion of the hub on which the rotor blades are mounted to illustrate the manner in which the load on the rotor blade is transferred to the spindle.

Referring to FIGURE 3, there is shown the coupling of FIGURE 2 assembled to support the rotor blade 11 on the spindle 26. The rotor hub 13 is shown with the spindle 26 extending at right angles to the axis of rotation 14; it is driven by the output shaft 15 extending from the gearbox 16 (FIGURE 2). In accordance with this invention, the rotor grip 18 is secured to the spindle 26 in the following manner. First, the radius ring 42 is pressed on the spindle 26 until it seats against the curved throat 27. Next, the grip retention nut 44 is placed on the spindle 26 and the packing seal 43 is slipped over the radius ring 42. Following this, the packing gland 47 is assembled into place and the packing seal 43 forced into the groove formed by the radius ring 42 and the packing gland. After this, the bearing 49 is pressed on the spindle 26 followed by the bearing 51 also being pressed on the spindle. The transfer ring 52 is then inserted into the transfer groove 28 against the raceway of the bearing 51. Next, the wedge ring 53 is placed over the transfer ring 52 such that the outer beveled surface of the split ring is in contact with the inner beveled surface of the wedge ring. Now the shim ring, or rings, 48 is placed over the spindle 26 between the radius ring 42 and the raceway of the bearing 49. The number of shims 48 assembled on the spindle 26 is such that with the split ring 52 seated into the outer portion of transfer groove 28. This is shown in FIGURE 3 where the edge of the bearing 51 extends past the ridge of the transfer groove 28.

After the correct number of shims 48 have been assembled on the spindle 26, the nut 54 is served on the threads 31 to force the wedge ring 53 onto the transfer ring 52. Following the installation of the components thus described, the spacer cylinder 38 is slipped over the entire assembly in contact with the outer surfaces of the ball bearings 49 and 51. Finally, the rotor grip 18 is telescoped over the spacer cylinder 38 and the grip retention nut 44 torqued into the threads 41 of the cavity 39 to bring the rotor grip to its proper position.

In some applications, it may be desired to insert shims 56 between the inturned edge of the spacer cylinder 38 and the outer surface of the raceway of the ball bearing 51. These shims are used for precise positioning of the center line of the machine screws 36 and 37 with respect to the axis 14.

In operation, the bending moment generated by rotor blade 11 is applied to the spindle 26 through the split transfer ring 52 from the raceway of the bearing 51.

Although specifically described with respect to a tail rotor, it is not intended that the invention be so limited. It is obvious that the coupling of this invention will be useful in other applications such as the main rotor, for example.

While only one embodiment of the invention, together with modifications thereof, has been described in detail herein and shown in the accompanying drawings, it will be evident that various further modifications are possible in the arrangement and construction of its components without departing from the scope of the invention.

We claim:
1. A system for transferring a bending moment in a rotor grip to a rotor hub comprising:
   a spindle attached to said rotor hub and having a fastener at one end thereof and a peripheral groove juxtapositioned said fastener,
   coupling means mounted on said spindle for supporting said rotor grip,
   a transfer ring positioned in said groove in contact with said coupling means, and
   means in engagement with said fastener for securing said transfer ring and said coupling means to said spindle.

2. A system for transferring a bending moment as set forth in claim 1 including wedging means between said fastener and said transfer ring to force said ring into said groove and against said coupling means.

3. A system for transferring a bending moment as set forth in claim 1 including means for positioning said transfer ring when bending moments are not present in said rotor grip.

4. A system for transferring a bending moment in a rotor grip to a rotor hub comprising:
   a spindle attached to said rotor hub having a threaded end and a peripheral groove of radius of curvature which is large compared with the radius of curvature in said threaded end, said groove being juxtapositioned said threaded end,
   bearing means on said spindle for rotatably supporting said rotor grip,
   a transfer ring nested in said groove in contact with said bearing means, and
   fastener means served onto said threaded end for securing said transfer ring and said bearing means to said spindle.

5. A system for transferring a bending moment as set forth in claim 4 wherein said fastener means includes a wedging ring having an inner beveled surface in engagement with said transfer ring.

6. A system for transferring a bending moment as set forth in claim 5 including a shim in contact with said bearing means opposite from said transfer ring to position said transfer ring when the bending moment in said rotor grip is zero.

7. A system for transferring a bending moment as set forth in claim 6 wherein said transfer ring includes two semicircular sections each having an inner surface with a radius of curvature substantially the same as the radius of curvature of said peripheral groove.

8. Apparatus for coupling a flapping rotor to a rotor hub comprising:
   a rotor grip fastened to said flapping rotor,
   a spindle attached to said rotor hub having a threaded end and a peripheral groove of radius of curvature which is large compared with the radius of curvature of said threaded end, said groove being juxtapositioned said threaded end,
   a radius ring assembled on said spindle at the end attached to said rotor hub,
   a packing gland in spaced relationship with said radius ring and forming a peripheral groove therewith,
   a packing seal assembled into said peripheral groove formed between said packing gland and said radius ring,
   bearing means mounted on said spindle adjacent said radius ring for rotatably supporting said rotor grip,
   a transfer ring positioned in the peripheral groove of said spindle in contact with said bearing means opposite from said radius ring, and
   fastening means in engagement with the threaded end of said spindle for securing said transfer ring, said bearing means, said packing gland, and said radius ring to said spindle.

9. Apparatus for coupling a flapping rotor to a rotor hub as set forth in claim 8 including a shim positioned between said radius ring and said bearing means to preload said transfer ring.

10. Apparatus for coupling a flapping rotor to a rotor hub as set forth in claim 9 including a spacer cylinder positioned between said bearing means and said rotor grip.

11. Apparatus for coupling a flapping rotor to a rotor hub as set forth in claim 10 including a grip retention nut for securing said rotor grip to said bearing means.

12. Apparatus for coupling a flapping rotor to a rotor hub as set forth in claim 11 including a thread relief groove in said spindle between said peripheral groove and said threaded end.

References Cited

UNITED STATES PATENTS

| | | | |
|---|---|---|---|
| 2,499,314 | 2/1950 | Hunt | 170—160.58 X |
| 3,237,698 | 3/1966 | Gandy | 170—160.58 X |

FOREIGN PATENTS

| | | |
|---|---|---|
| 351,339 | 8/1937 | Italy. |

EVERETTE A. POWELL, JR., Primary Examiner